(12) United States Patent
Wessels et al.

(10) Patent No.: US 8,877,057 B2
(45) Date of Patent: Nov. 4, 2014

(54) MANIFOLD AND FILTER ARRANGEMENT FOR BULK FLUID FILTRATION

(75) Inventors: Andre Wessels, Branston (ZA); Bradley Richard De Vaux, Greenstone Hill (ZA); Robin Glisson, Capetown (ZA); Philip Edward Johnson, Apple Valley, MN (US); Michelle D. Weiland, Eagan, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 523 days.

(21) Appl. No.: 13/097,469

(22) Filed: Apr. 29, 2011

(65) Prior Publication Data
US 2012/0273433 A1 Nov. 1, 2012

(51) Int. Cl.
| | | |
|---|---|---|
| B01D 35/30 | (2006.01) | |
| B01D 29/52 | (2006.01) | |
| B01D 46/00 | (2006.01) | |
| B01D 29/90 | (2006.01) | |
| B01D 29/92 | (2006.01) | |

(52) U.S. Cl.
CPC ............ B01D 46/001 (2013.01); B01D 35/303 (2013.01); *B01D 2201/0469* (2013.01); B01D 46/002 (2013.01); *B01D 2313/105* (2013.01); B01D 29/90 (2013.01); B01D 29/52 (2013.01); *B01D 2201/4023* (2013.01); B01D 29/92 (2013.01); *B01D 2313/125* (2013.01)
USPC ..................... 210/323.1; 210/323.2; 210/767; 210/232; 29/402.08

(58) Field of Classification Search
CPC .. B01D 29/0047; B01D 29/009; B01D 29/52; B01D 29/90; B01D 29/92; B01D 35/303; B01D 46/001; B01D 46/002; B01D 2201/0469; B01D 2201/4023; B01D 29/005; B01D 2201/0492

USPC .......... 210/232, 323.1, 323.2, 767; 29/402.08
See application file for complete search history.

(56) References Cited

U.S. PATENT DOCUMENTS

| | | | | |
|---|---|---|---|---|
| 3,598,243 A | * | 8/1971 | Gutkowski | 210/340 |
| 6,017,451 A | * | 1/2000 | Kopf | 210/232 |
| 6,139,741 A | * | 10/2000 | McGibbon | 210/323.1 |

FOREIGN PATENT DOCUMENTS

WO    WO 98/57725    12/1998

OTHER PUBLICATIONS

International Search Report and Written Opinion mailed Jul. 17, 2012.
Declaration of Philip Johnson; Jun. 11, 2013, 4 pages.
Exhibit A, Brochure entitled, "Bulk Fuel and Lube Filtration Systems," 2011, 3 pages.
Exhibit B, Excerpts from catalog entitled, "Bulk Fuel and Lube Filtration Product Guide," pp. 7-9, and 11; 2011.
Brochure entitled, "Cat® Bulk Fuel Filtration Systems," 4 pages 2006.

* cited by examiner

*Primary Examiner* — Bobby Ramdhanie
*Assistant Examiner* — Patrick Orme
(74) *Attorney, Agent, or Firm* — Merchant & Gould P.C.

(57) ABSTRACT

A filter for use with bulk filtration includes filters arranged in parallel flow and a manifold arrangement. The manifold arrangement has a first pipe within a second pipe. An inlet channel conveys unfiltered fluid to the filters, and an outlet channel conveys filtered fluid from the filters. The inlet channel is an interior volume between an outside surface of the first pipe and an inside surface of the second pipe. The outlet channel is an interior volume of the first pipe. Methods of servicing and filtering are provided.

8 Claims, 5 Drawing Sheets

MANIFOLD AND FILTER ARRANGEMENT FOR BULK FLUID FILTRATION

TECHNICAL FIELD

This disclosure concerns bulk fluid filtration. In particular, this disclosure concerns a manifold arrangement, a filter arrangement, and methods utilizing them for bulk fluid filtration.

BACKGROUND

Fluids, such as fuel and oil, need to achieve long component life on heavy and mobile equipment. In many instances, the filtration systems on machines are not for cleaning heavily contaminated fuel and oil.

In some systems, the supply fuel and oil is stored in a storage tank, and some water and dirt can be removed by using tank settling and draining practices. Remaining water and contaminants can be removed by using bulk filtration.

Existing bulk filtration systems are large, cumbersome, and heavy. Improvements are needed.

SUMMARY

A filter arrangement is provided. In preferred uses, the filter arrangement is for use in bulk filtration systems.

In one application, the filter arrangement includes a plurality of filters arranged in parallel flow to each other. Each of the filters has filter media with an upstream side and a downstream side. A manifold arrangement is provided. The manifold arrangement is operably connected to the plurality of filters. In preferred systems, the manifold arrangement includes first and second pipes, with the first pipe being within the second pipe.

In example systems, the manifold arrangement has an inlet channel to convey unfiltered fluid to the upstream side of the filer media of the filters. The inlet channel may be an interior volume between an outside surface of the first pipe and an inside surface of the second pipe.

In example systems, an outlet channel is provided to convey filtered fluid from the downstream side of the filter media of the filters. The outlet channel may be an interior volume of the first pipe.

In example implementations, a manifold arrangement for operably connecting to a plurality of filters is provided. The manifold arrangement includes a first pipe, a second pipe, and a plurality of spigots. The first pipe has a first pipe outer wall surrounding a first open interior volume. The first pipe has a blank flange in the first interior volume separating the first pipe into an inlet section and an outlet section. The first pipe outer wall has an inlet aperture arrangement in the inlet section. The first pipe outer wall has a plurality of outlet apertures in the outlet section. The second pipe has a second pipe outer wall surrounding a second pipe interior volume. The first pipe is operably positioned within the second pipe interior volume. The second pipe outer wall has a plurality of filter engaging apertures. Each spigot in the plurality of spigots is connected to a respective one of the outlet apertures in the outlet section of the first pipe outer wall. Each of the spigots in the plurality of spigots is in communication with a respective one of the filter engaging apertures of the second pipe outer wall.

A method of servicing a filter arrangement is provided. The method includes a step of removing a first filter from a manifold arrangement. The manifold arrangement includes first and second pipes. The first pipe is within the second pipe. The manifold arrangement includes an inlet channel formed by an interior volume between an outside surface of the first pipe and an inside surface of the second pipe. The manifold arrangement also includes an outlet channel formed by an interior volume of the first pipe. The method includes providing a second filter and connecting the second filter to the manifold arrangement so that the second filter is in fluid communication with the inlet channel and the outlet channel.

A method of filtering is provided. The method includes a step of providing a manifold arrangement including first and second pipes. The first pipe is within the second pipe. The manifold arrangement has an inlet channel between an outside surface of the first pipe and an inside surface of the second pipe. The manifold arrangement also includes an outlet channel in an interior volume of the first pipe. The method of filtering includes providing a plurality of filters arranged in parallel flow to each other and in fluid communication with the manifold arrangement. There is a step of directing fluid to be filtered into the first pipe and then through an inlet aperture arrangement in the first pipe to the inlet channel. There is a step of directing the fluid from the inlet channel and through the filters. There is a step of directing the fluid from the filters and then through outlet apertures in the first pipe to the outlet channel. There is also a step of directing the fluid from the manifold arrangement from the first pipe.

It is noted that not all the specific features described herein need to be incorporated in an arrangement for the arrangement to have some selected advantage according to the present disclosure.

It is to be understood that both the foregoing general description and the following detailed description are exemplary and explanatory only and are not restrictive, as claimed. The accompanying drawings, which are incorporated in and constitute a part of this specification, illustrate example embodiments and together with the description, serve to explain the principles.

DETAILED DESCRIPTION

A new and improved filter arrangement for using in bulk filtration systems is provided that filters large volumes of fluids (for example, fuel, diesel or oil) at high flow rates. The resulting compact manifold allows for fitment of multiple filters in parallel flow to each other. The resulting design is smaller (not cumbersome, and lightweight—only about 60 pounds, as compared to 200 pounds) than the previous filter systems. The structural configuration of the resulting filter arrangement allows for these advantages over the old prior art.

Figure 1:
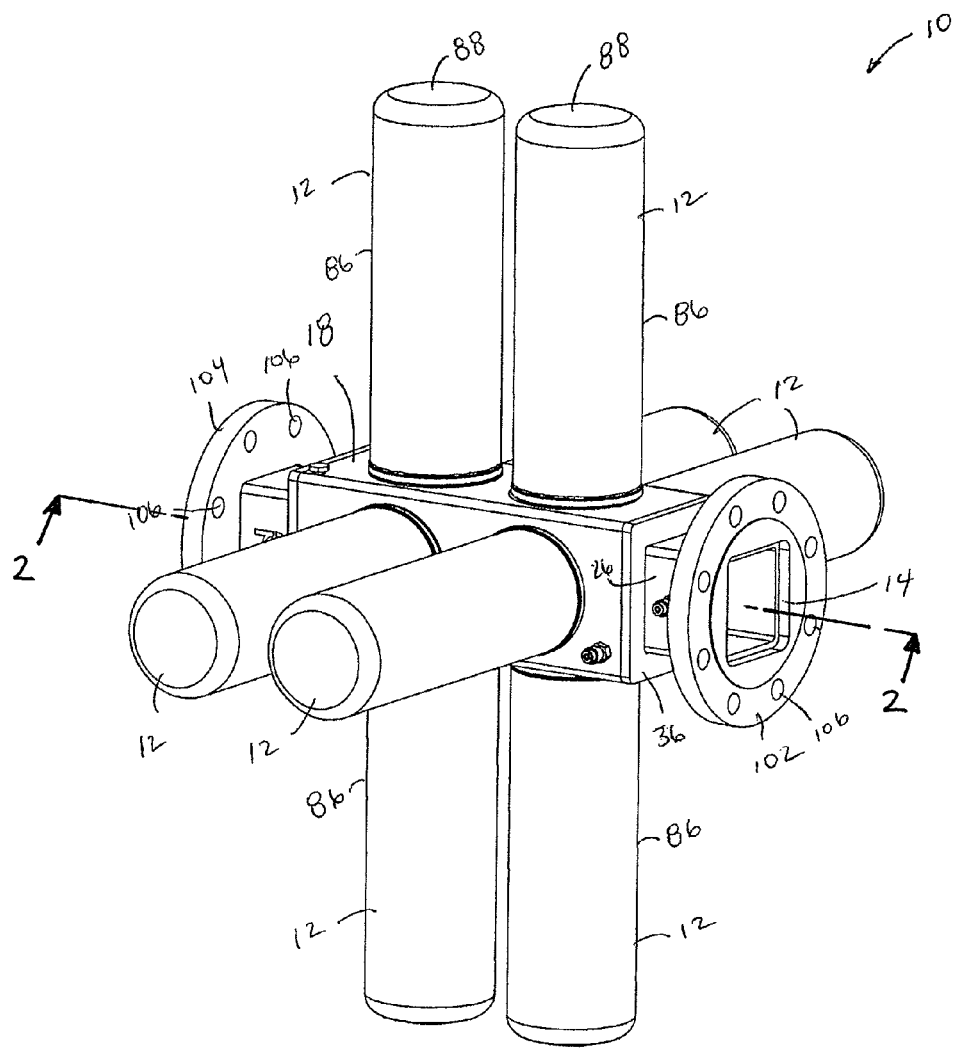
FIG. 1 is a perspective view of one example embodiment of a filter arrangement for bulk fluid filtration, constructed in accordance with principles of this disclosure.

One example embodiment of a filter arrangement constructed in accordance with principles of this disclosure is shown in FIG. 1 at 10. In the embodiment of FIG. 1, the filter arrangement 10 shows a plurality of filters 12. The filters 12, in this example, are depicted as being arranged in parallel flow to each other. By "parallel flow" it is meant that the filters 12 are not arranged in series (i.e., are "series-free"). In parallel flow, the flow of fluid from one point to another (from the manifold inlet 14 to the manifold outlet 16, FIG. 2) goes through multiple paths, with each filter 12 being a different path. This type of arrangement allows for faster filtration with a high flow rate, such as up to 500 gallons per minute. Larger versions using a similar design could also be made, which would have higher flow rates.

The filter arrangement 10 includes a manifold arrangement 18. The manifold arrangement 18 is operably connected to the plurality of filters 12. As can be seen in FIG. 1, the filters 12 are operably connected to the manifold arrangement 18 such that they are connected on each side of the manifold arrangement 18. In the example shown in FIG. 1, the manifold arrangement 18 is rectangular, such as square, shaped, so that the filters 12 are on each of the 4 sides or planes of the manifold arrangement 18 and are spaced 90 degrees apart from the next filter 12. In other embodiments, the manifold arrangement 18 may not be rectangular shaped, but could be other shapes such as round. In round shapes, the filters 12 preferably will be about evenly circumferentially spaced from each other about the circumference of the manifold arrangement 18. Other embodiments are possible.

In the embodiment of FIG. 1, there are a total of eight filters 12 depicted. There are two filters 12 on each of the four sides of the rectangular shaped manifold arrangement 18. In other embodiments, the manifold arrangement 18 can fit configurations of 4, 12, and 16 filters 12 in parallel flow to each other.

Figure 2:
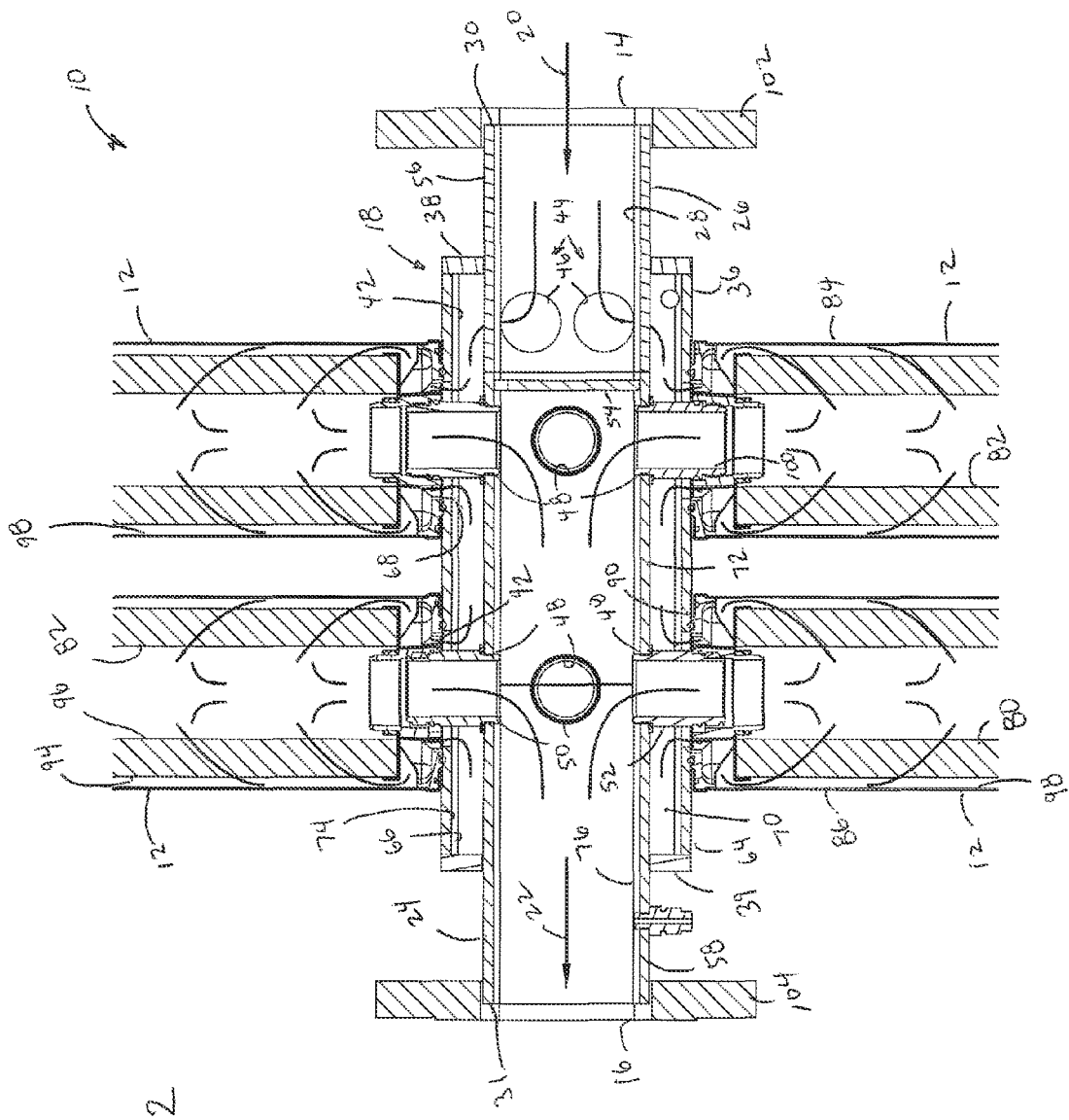
FIG. 2 is a schematic cross-sectional view of a portion of the filter arrangement of FIG. 1 and showing fluid flow through the filter arrangement.

Attention is directed to FIG. 2. FIG. 2 shows a schematic, cross-sectional view of the manifold arrangement 18 and a portion of the filters 12. It shows a sample flow pattern of fluid as fluid enters the manifold inlet 14 and then exits at the manifold outlet 16. From FIG. 2, it should be apparent that the filter arrangement 10 is constructed so that it allows for in-line installation in a bulk fluid filter system. By the term "in-line", it is meant that no corners, elbow tubes, or other types of bent tubing are needed to install the filter arrangement 10. That is, the inlet 14 is in direct connection with a pipe that would carry fluid to be filtered, while the outlet 16 is in direct connection with a pipe that would carry filtered fluid to downstream equipment. The fluid to be filtered does not need to turn a corner as it exits the tube that is carrying it for or when it enters the filter arrangement 10, and the fluid after it has been filtered does not need to turn a corner as it exits the filter arrangement 10 to the pipe carrying it to downstream equipment.

In general, in FIG. 2, the fluid to be filtered is shown at arrow 20. This fluid would generally come from some type of storage tank, and then be conveyed through a pipe to get to the inlet 14 of the manifold arrangement 18. The fluid would then flow through one of the filters 12, which would remove contaminant. Then the fluid would flow back into the manifold arrangement 18 and exit the manifold arrangement 18 through the outlet 16 as shown at arrow 22.

An example embodiment of one useful manifold arrangement 18 can be seen in FIGS. 2-5. It should be understood that this description is for just one example, but many different embodiments can be made by applying the inventive concepts. The manifold arrangement 18, in the example depicted, includes a first pipe 24. The first pipe 24 has a first pipe outer wall 26 surrounding a first open interior volume 28. In the embodiment shown, the first pipe 24 has a rectangular, such as a square, cross-section. In other embodiments, the pipe can have other shapes, such as tubular, rounded, or circular configurations.

The first pipe 24, in the embodiment shown, extends between opposite first and second ends 30, 31. The first end 30 defines the manifold inlet 14, while the second end 31 defines the manifold outlet 16.

The first pipe outer wall 26 defines or has an inlet aperture arrangement 44. The inlet aperture arrangement 44 is depicted as a plurality of apertures 46 going through the wall 26 to allow for the passage of fluid from the first open interior volume 28, through the apertures 46, and to the volume outside of the first pipe 24. In this embodiment, the volume outside of the first pipe 24 is an inlet channel 42. The inlet aperture arrangement 44 may be embodied in other forms, and need not be in the form of the circular apertures 46 as depicted. That is, any type of openings through the outer wall 26 of the first pipe 24 will suffice.

The first pipe outer wall 26 includes a plurality of outlet apertures 48. The outlet apertures 48 allow for the flow of fluid from a region outside of the first pipe 24 and into the first open interior volume 28. In the embodiment shown, the outlet apertures 48 are shown as circular holes 50, which accommodate spigots 52. Other embodiments are possible.

The first pipe 24 further includes a blank flange 54. The blank flange 54 is located in the first open interior volume 28, and is shown perpendicular to the outer wall 26. The blank flange 54 separates the first pipe 24 into an inlet section 56 and an outlet section 58. In the embodiment shown, the inlet aperture arrangement 44 is located in the inlet section 56, while the outlet apertures 48 are located in the outlet section 58. In preferred embodiments, there is one outlet aperture 48 for each filter 12.

Figure 3:
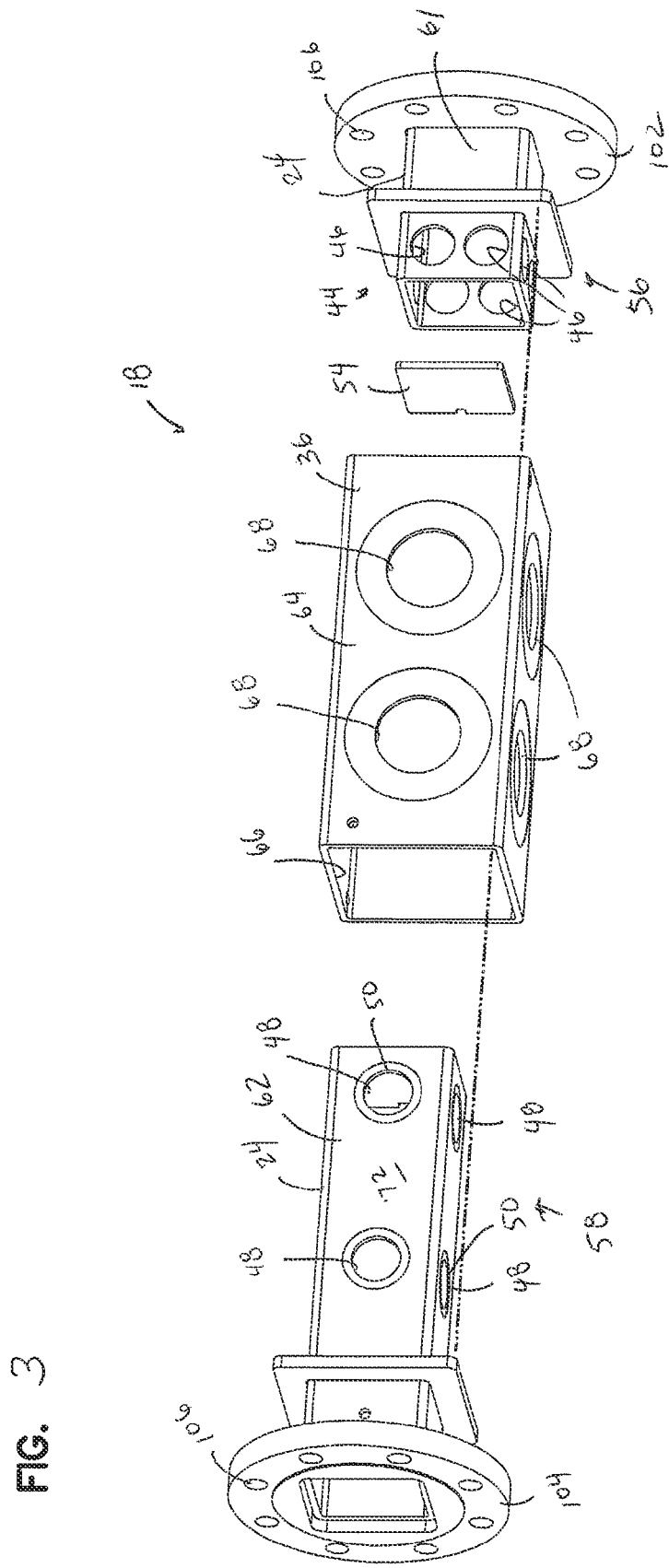
FIG. 3 is an exploded perspective view of a portion of the manifold arrangement, which is part of the filter arrangement depicted in FIG. 1, constructed in accordance with principles of this disclosure.
Figure 4:
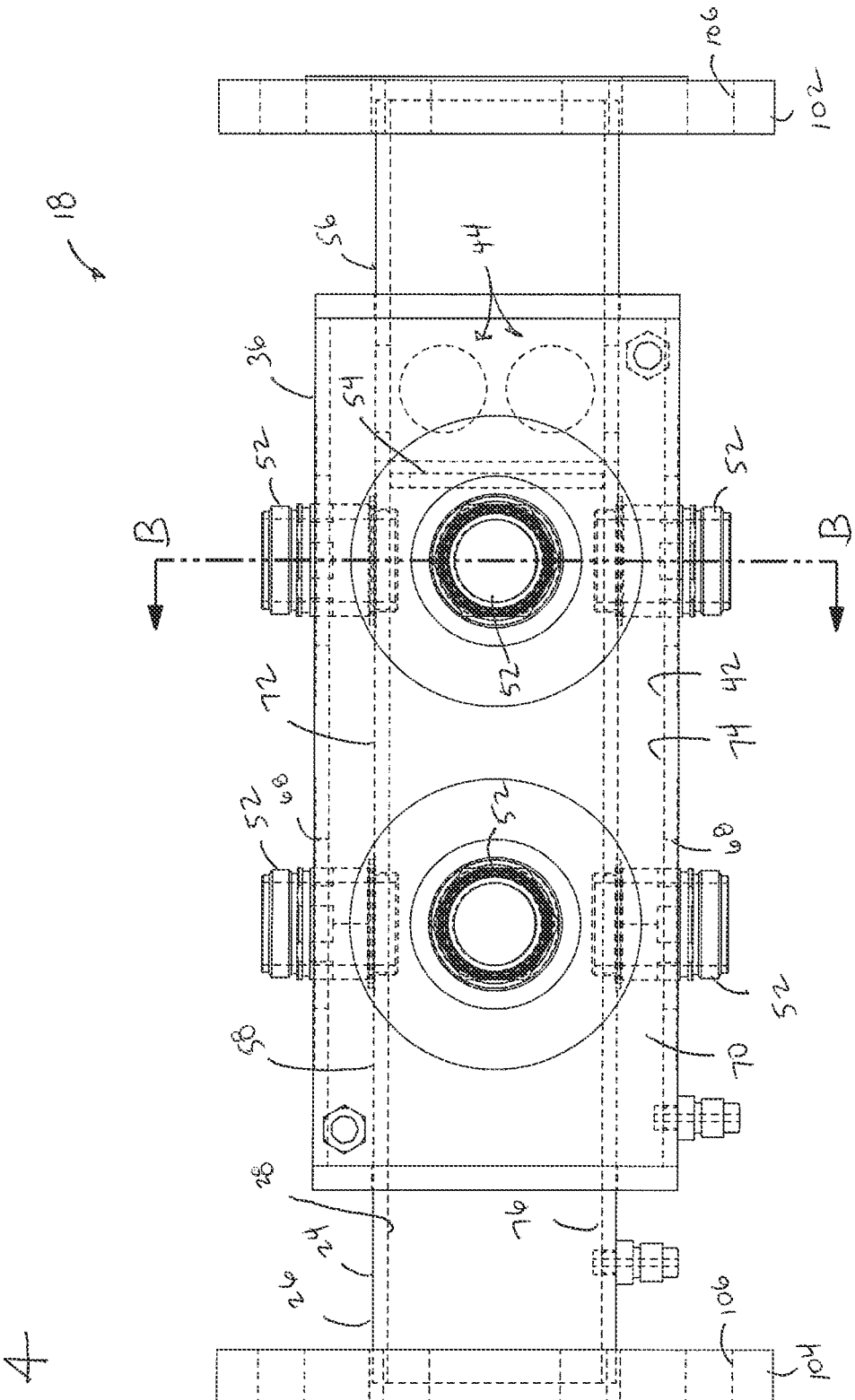
FIG. 4 is a top view of the manifold arrangement, which is part of the filter arrangement depicted in FIG. 1, constructed in accordance with principles of this disclosure.

In some arrangements, the first pipe 24 can be one continuous unitary structure. In other arrangements, such as shown in FIG. 3, the first pipe 24 is made from two separate sections 61, 62 that are connected, joined, or bonded together. In FIG. 3, the section 61 forms the inlet section 56, while the section 62 forms the outlet section 58. The blank flange 54 is connected, joined, or bonded at the interface between the section 61 and section 62.

Figure 5:
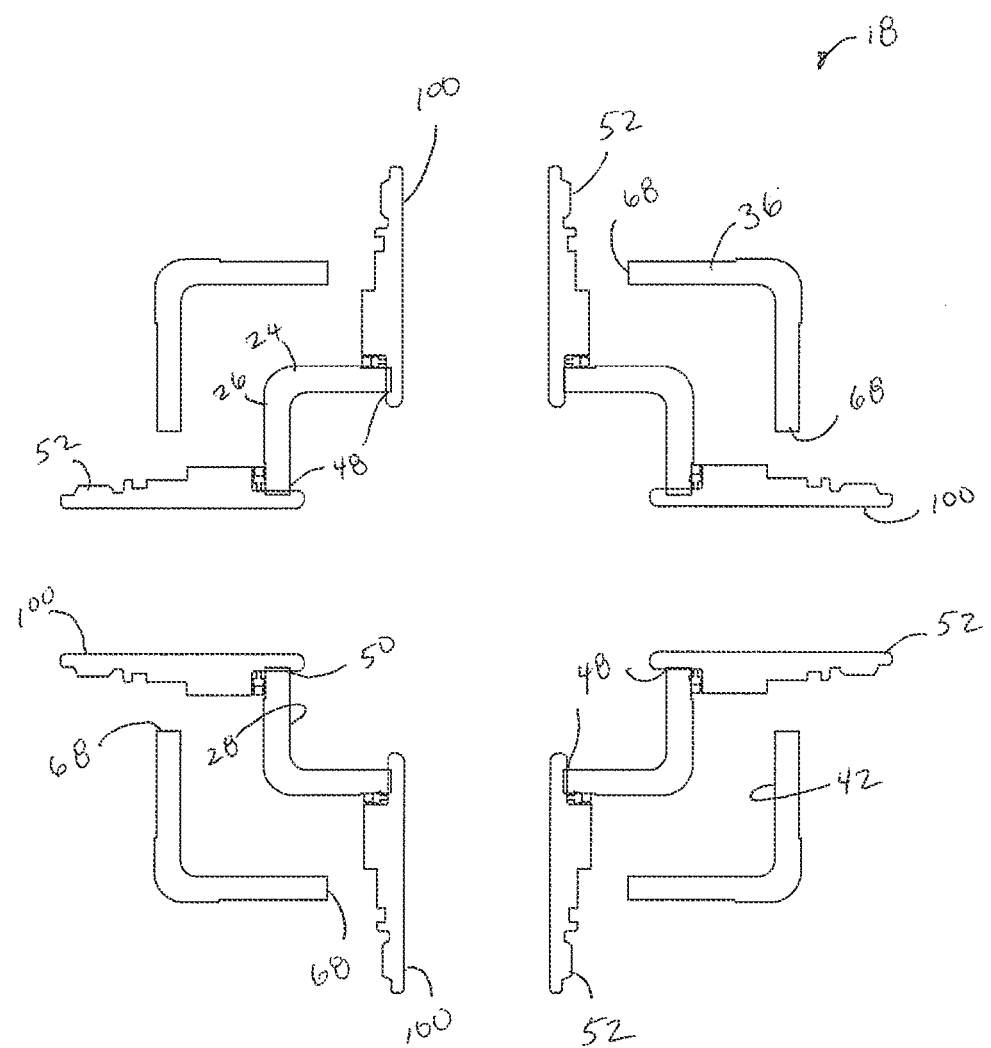
FIG. 5 is a cross-sectional view of the manifold arrangement, the cross-section being taken along the line B-B of FIG. 4.

Still in reference to FIGS. 2-5, in this embodiment, the manifold arrangement 18 further includes a second pipe 36. The second pipe 36 has a second pipe outer wall 64, which surrounds a second pipe interior volume 66. The first pipe 24 is operably positioned within the second pipe interior volume 66. As can be seen in FIGS. 2 and 5, in the example depicted, the first pipe 24 is shown as being parallel and coaxial with the second pipe 36. In other embodiments, the first and second pipes 24, 36 need not necessarily be coaxial and need not necessarily be parallel.

The second pipe 36 has opposite first and second ends 38, 39. In FIG. 2, it can be seen how the first and second ends 38, 39 are closed and are against the outer wall 26 of first pipe 36. The first and second ends 38, 39 are shown to be spaced away from the respective inlet 14 and outlet 16 and also from the respective first and second ends 30, 31 of the first pipe 24. In other embodiments, the first and second ends 38, 39 of the second pipe 36 may be closer or even with the first and second ends 30, 31 of the first pipe 24. The closed nature of the first and second ends 38, 39 of the second pipe 36 help to define an inlet channel 42, discussed further below.

The second pipe outer wall 64 has a plurality of filter engaging apertures 68 located therein. Preferably, there is one filter engaging aperture 68 for each one of the filters 12. In preferred arrangements, the filter engaging apertures 68 are generally coaxial with the outlet apertures 48 of the first pipe 24. While various embodiments are possible in the example shown in FIG. 2, the filter engaging apertures 68 are large enough to accommodate fluid flow that is flowing into the filters 12 and also the spigots 52 that are allowing the filtered flow to exit the filters 12. When the second pipe 36 is in the form of a rectangle, such as square, cross-section, preferably there are filter engaging apertures 68 on each plane or side of the second pipe 36. In embodiments where the second pipe 36 is tubular or circular, the filter engaging apertures 68 can be evenly circumferentially spaced about the second pipe outer wall 64.

The inlet channel 42 is formed by an interior volume 70 between an outside surface 72 of the first pipe 24 and an inside surface 74 of the second pipe 36. As can be appreciated from viewing FIG. 2, fluid to be filtered is shown at arrow 20 flowing through the manifold inlet 14, into the first open interior volume 28 of the first pipe 24, through the inlet aperture arrangement 44, out of the first pipe 24 and into the inlet channel 42, which is part of the second pipe interior volume 66. From there, the fluid flows through the filter engaging apertures 68 and into one of the filters 12. After being cleaned by the filters 12, the fluid flows through the spigots 52 and into the first open interior volume 28 of the first pipe 24. From there, the fluid exits at arrow 22 through the manifold outlet 16. The first open interior volume 28 of the first pipe 24 forms an outlet channel 76, which is downstream of the outlet apertures 48 and is part of the outlet section 58 of the first pipe 24.

The manifold arrangement 18 further includes a plurality of spigots 52, as mentioned above. In the example embodiment shown, each of the spigots 52 in the plurality of spigots is connected to a respective one of the outlet apertures 48 in the outlet section 58 of the first pipe outer wall 26. Preferably, each spigot 52 in the plurality of spigots is in communication with a respective one of the filter engaging apertures 68 of the second pipe outer wall 64.

The spigots 52 may be attached to the first pipe 24 in a variety of ways. The spigots 52 may be permanently attached by way of bonding or welding, for example. In the embodiment shown, the spigots 52 are attached to the first pipe 24 at the outlet apertures 48 by way of a threaded connection. When a threaded connection is used, the spigots 52 are removably connected to the respective outlet aperture 48, in case the spigot 52 becomes damaged and/or needs replacement. In the embodiment shown, each spigot 52 is shown extending from the outlet aperture 48 at least to and preferably through the filter engaging aperture 68 of the second pipe outer wall 64.

The manifold arrangement 18 can also include connector flanges 102, 104 attached or connected to the first pipe 24 at the ends 30, 31. The connection need not necessarily be at the ends 30, 31 of the first pipe 24. The connector flanges 102, 104 have holes 106 that receive fasteners to allow the manifold arrangement 18 to be fastened or connected in-line to existing pipes carrying fluid to be filtered.

Various types of filters 12 can be used. In the embodiment shown, the filters 12 include filter media 80 in a tubular, such as cylindrical, form having an open filter interior 82 therewithin. The filters 12 can be, for example, spin-on filters 84. Each spin-on filter 84 includes an outer can or housing 86 operably holding the filter media 80 therewithin. The housing 86 has a closed end 88 (FIG. 1) and an opposite open mouth or end 90. The open end 90 will typically have a thread plate 92 that allows for a threaded connection between the spin-on filter 84 and the spigot 52. Appropriate gaskets form seals between the filters 12, the second pipe 36, and the spigots 52.

As can be appreciated from FIG. 2, when the filter media 80 is in the form of a tube or cylinder, it has an upstream side 94 and a downstream side 96. In the embodiment shown, the upstream side 94 is the outside of the media 80, while the downstream side 96 is the inside, which is part of the open filter interior 82. Dirty fluid flows through the filter engaging aperture 68, into the filters 12, and into the volume 98 between the housing 86 and the upstream side 94 of the media 80. The fluid then flows through the upstream side 94, through the media 80, and through the downstream side 96 and into the open filter interior 82. From the open filter interior 82, the fluid flows through the inside 100 of the spigots 52 and then into the outlet channel 76 of the first pipe 24.

After a period of operation, the filter arrangement 10 will need to be serviced. To service the filter arrangement 10, a method of servicing can be applied. The method of servicing includes removing a first filter, such as one of the filters 12, from the manifold arrangement 18. If the filter 12 is a spin-on filter, it is removed from the manifold arrangement 18 by spinning or unthreading the filter 12 from the spigot 52. Only a single filter may be serviced, or some or all of the filters 12 can be serviced by removing from the manifold arrangement 18.

Next, there is a step of providing a second filter, usually a new filter with new filter media. The second filter is connected to the manifold arrangement 18 so that the second filter is in fluid communication with the inlet channel 42 and the outlet channel 76. This step can include providing only a single new filter (if only one is being replaced) or providing a plurality of new filters, if a plurality or all of the filters need replacing. If a spin-on filter is used, the second filter is connected to the manifold arrangement 18 by spinning or threading the new filter onto the spigot 52.

The method of servicing may also include replacing one or more of the spigots 52. If one of the spigots 52 is damaged, it may be removed from the first pipe 24 by unthreading it from the first pipe 24. It may be replaced with a new spigot by threading the new spigot into the outlet aperture 48 of the first pipe 24.

The step of providing the second filter may also include forming new seals between the second filter and the second pipe 36 and between the filter and the spigot 52.

A method of filtering should be apparent from the above description. The method would include providing the manifold arrangement 18 having the first pipe 24 and second pipe 36. The first pipe 24 is within the second pipe 36. The manifold arrangement 18 has the inlet channel 42 located between the outside surface 72 of the first pipe 24 and the inside surface 74 of the second pipe 36. The manifold arrangement 18 also includes the outlet channel 76, which is the interior volume 28 of the first pipe 24. The method of filtering further includes providing the plurality of filters 12 arranged in parallel flow to each other and in fluid communication with the manifold arrangement 18.

Next, there is a step of directing fluid to be filtered into the first pipe 24 and then through the inlet aperture arrangement 68 in the first pipe 24 to the inlet channel 42.

The method of filtering further includes directing the fluid from the inlet channel 42 and through the filters 12. Within the filters 12, the fluid flows from the upstream side 94, through the media 80, and to the downstream side 96. The fluid then flows through the inside 100 of the spigots 52 and then through the outlet apertures 48 in the first pipe 24 to the outlet channel 76. Next, the fluid is directed from the manifold arrangement 18 from the first pipe 24, which allows it to exit through manifold outlet 16.

The step of directing the fluid from the inlet channel 42 and through the filters 12 includes directing the fluid from the inlet channel 42 and through the filter engaging apertures 68 in the second pipe 36 and then into the filters 12.

The step of directing the fluid from the filters 12 and then through the outlet apertures 48 in the first pipe 24 to the outlet channel 76 includes directing the fluid from the filters 12 and through the spigots 52 extending between the filters 12 and the outlet apertures 48 in the first pipe 24.

In many applications, the flow through the filter arrangement 10 can be up to 500 gallons per minute. The flow can typically range from 50 and 500 gallons per minute. Larger versions can be constructed to accommodate flow rates larger than 500 gallons per minute.

Other embodiments will be apparent to those skilled in the art from consideration of the specification and practice as disclosed herein. It is intended that the specification and examples be considered as exemplary only. Not all the specific features described herein need to be incorporated in an arrangement for the arrangement to have some selected advantage according to the present disclosure.

What is claimed is:

1. A manifold arrangement for operably connecting to a plurality of filters; the manifold arrangement comprising:
   (a) a first pipe having a first pipe outer wall surrounding a first open interior volume;
      (i) the first pipe having a blank flange in the first interior volume separating the first pipe into an inlet section and an outlet section;
      (ii) the first pipe outer wall having an inlet aperture arrangement in the inlet section;
      (iii) the first pipe outer wall having a plurality of outlet apertures in the outlet section;
   (b) a second pipe having a second pipe outer wall surrounding a second pipe interior volume;
      (i) the first pipe being operably positioned within the second pipe interior volume;
      (ii) the second pipe outer wall having a plurality of filter engaging apertures;
      (iii) the second pipe outer wall being rectangular having 4 sides;
      (iv) the filter engaging apertures in the second pipe outer wall being on each of the 4 sides and spaced 90 degrees apart; and
   (c) a plurality of spigots;
      (i) each of the plurality of spigots being connected to a respective one of the outlet apertures in the outlet section of the first pipe outer wall; and
      (ii) each of the plurality of spigots being in communication with a respective one of the filter engaging apertures of the second pipe outer wall.

2. A manifold arrangement according to claim 1 wherein:
   (a) each of the plurality of spigots is removably connected to the respective one of the outlet apertures.

3. A manifold arrangement according to claim 1 wherein:
   (a) each of the plurality of spigots projects through the respective one of the filter engaging apertures of the second pipe outer wall.

4. A manifold arrangement according to claim 1 wherein:
   (a) the first pipe has opposite first and second ends, and the second pipe is between and spaced from the first and second ends of the first pipe.

5. A manifold arrangement according to claim 1 wherein:
   (a) the first pipe and second pipe are straight and free of bends.

6. A manifold arrangement according to claim 1 wherein:
   (a) the blank flange in the first interior volume separates the first pipe into an unfiltered inlet section and a filtered outlet section.

7. A manifold arrangement according to claim 1 wherein:
   (a) each of the 4 sides of the second pipe outer wall is flat.

8. A manifold arrangement according to claim 1 wherein:
   (a) there are a plurality of filter engaging apertures in the second pipe along each of the 4 sides.

* * * * *